United States Patent
Dherange et al.

(10) Patent No.: US 11,194,691 B2
(45) Date of Patent: Dec. 7, 2021

(54) ANOMALY DETECTION USING DEEP LEARNING MODELS

(71) Applicant: GURUCUL SOLUTIONS, LLC, El Segundo, CA (US)

(72) Inventors: Nilesh Dherange, El Segundo, CA (US); Saryu Nayyar, El Segundo, CA (US); Naveen Vijayaraghavan, El Segundo, CA (US); Puneet Gajria, El Segundo, CA (US); Aruna Rajasekhar, El Segundo, CA (US)

(73) Assignee: GURUCUL SOLUTIONS, LLC, El Segundo, CA (US)

( * ) Notice: Subject to any disclaimer, the term of this patent is extended or adjusted under 35 U.S.C. 154(b) by 112 days.

(21) Appl. No.: 16/428,302

(22) Filed: May 31, 2019

(65) Prior Publication Data

US 2020/0379868 A1 Dec. 3, 2020

(51) Int. Cl.
| | | |
|---|---|---|
| *G06F 11/34* | (2006.01) | |
| *G06K 9/62* | (2006.01) | |
| *G06N 20/20* | (2019.01) | |
| *G06N 7/00* | (2006.01) | |
| *G06N 5/00* | (2006.01) | |

(52) U.S. Cl.
CPC ........ *G06F 11/3452* (2013.01); *G06K 9/6215* (2013.01); *G06K 9/6223* (2013.01); *G06N 5/003* (2013.01); *G06N 7/005* (2013.01); *G06N 20/20* (2019.01)

(58) Field of Classification Search
CPC ............ G06N 20/00; G06N 3/08; G06N 3/02; G06N 20/20; G06N 5/003; G06N 7/005; H04L 63/1425; G06F 16/285; G06F 11/3452; G06K 9/6215; G06K 9/6223
See application file for complete search history.

(56) References Cited

U.S. PATENT DOCUMENTS

| | | |
|---|---|---|
| 10,045,218 B1 | 8/2018 | Stapleton et al. |
| 10,129,118 B1 | 11/2018 | Ghare et al. |
| 2012/0254333 A1 | 10/2012 | Chandramouli et al. |

(Continued)

FOREIGN PATENT DOCUMENTS

WO WO-2019035765 A1 * 2/2019 ......... G06F 17/2715

OTHER PUBLICATIONS

Cvitanic, T., et al., "LDA v. LSA: A Comparison of Two Computational Text Analysis Tools for the Functional Categorization of Patents," 2016, International Conference on Case-Based Reasoning, pp. 1-10 (Year: 2016).*

(Continued)

*Primary Examiner* — Miranda M Huang
*Assistant Examiner* — Catherine F Lee
(74) *Attorney, Agent, or Firm* — Perkins Coie LLP

(57) ABSTRACT

A computer-implemented method for anomaly detection based on deep learning includes acquiring a plurality of records, each record having a corresponding number of attributes, identifying outliers in the plurality of records using labels generated from processing the plurality of records through an ensemble of different deep learning models, wherein an output of at least one model is used as an input to at least one other model and detecting anomalies in the plurality of records using a probabilistic classifier based on plurality of records and labels.

18 Claims, 13 Drawing Sheets

(56) References Cited

U.S. PATENT DOCUMENTS

| | | | |
|---|---|---|---|
| 2012/0278890 A1* | 11/2012 | Maatta | H04L 63/1425 726/23 |
| 2018/0004948 A1 | 1/2018 | Martin et al. | |
| 2018/0176247 A1 | 6/2018 | Smith et al. | |
| 2019/0081876 A1 | 3/2019 | Ghare et al. | |
| 2019/0081969 A1 | 3/2019 | Phadke et al. | |
| 2019/0102553 A1 | 4/2019 | Herwadkar et al. | |
| 2019/0116157 A1 | 4/2019 | Kishikawa et al. | |
| 2020/0265119 A1* | 8/2020 | Desai | G06K 9/6226 |

OTHER PUBLICATIONS

Zhang, K., et al., "Automated IT System Failure Prediction: A Deep Learning Approach," 2016, IEEE Conference on Big Data, pp. 1291-1300 (Year: 2016).*

Brownlee, "Why One-Hot Encode Data in Machine Learning?", 2017, https://web.archive.org/web/20171218075102/https://machinelearningmastery.com/why-one-hot-encode-data-in-machine-learning/, pp. 1-2 (Year: 2017).*

Elbasiony et al., "A hybrid network intrusion detection framework based on random forests and weighted k-means," Mar. 7, 2013, Ain Shams Engineering Journal 4, pp. 753-762 (Year: 2013).*

Pajouh et al., "Two-tier network anomaly detection model: a machine learning approach," 2017, Journal of Intelligent Information Systems 48, pp. 61-74 (Year: 2017).*

Huang et al., "Topic Detection from Microblogs Using T-LDA and Perplexity," 2017, IEEE, 24th Asia-Pacific Software Engineering Conference Workshops, pp. 71-77 (Year: 2017).*

Chalapathy et al., "Deep Learning for Anomaly Detection: A Survey," Jan. 23, 2019, arXiv:1901.03407v2 [cs.LG], pp. 1-50 (Year: 2019).*

Lu et al., "Three-level Hybrid Intrusion Detection System," 2009, IEEE, 4 pages (Year: 2009).*

Zhang et al., "Anomaly Based Network Intrusion Detection with Unsupervised Outlier Detection," 2006, IEEE, pp. 2388-2393 (Year: 2006).*

Rowe et al., "Finding anomalous and suspicious files from directory metadata on a large corpus," Oct. 2011, 3rd International ICST Conference on Digital Forensics and Cyber Crime, 16 pages (Year: 2011).*

Gogoi et al., "A Survey of Outlier Detection Methods in Network Anomaly Identification," Published by Oxford University Press on behalf of the British Computer Society, The Computer Journal, vol. 54, No. 4, 2011, pp. 570-588.

* cited by examiner

| | sepal_length | sepal_width | petal_length | petal_width | target_name | lof_score | lof_label | prob_petal_length | prob_petal_width | prob_target_name |
|---|---|---|---|---|---|---|---|---|---|---|
| 0 | 5.1 | 3.5 | 0 | 0 | setosa | 0.000000 | False | 0.153333 | 0.226667 | 0.333333 |
| 1 | 4.9 | 3.0 | 0 | 0 | setosa | 0.000000 | False | 0.153333 | 0.226667 | 0.333333 |
| 2 | 4.7 | 3.2 | 0 | 0 | setosa | 0.000000 | False | 0.153333 | 0.226667 | 0.333333 |
| 3 | 4.6 | 3.1 | 1 | 0 | setosa | 0.000000 | False | 0.093333 | 0.226667 | 0.333333 |
| 4 | 5.0 | 3.6 | 0 | 0 | setosa | 0.000000 | False | 0.153333 | 0.226667 | 0.333333 |
| 5 | 5.4 | 3.9 | 2 | 2 | setosa | 1.058458 | False | 0.086667 | 0.106667 | 0.333333 |
| 6 | 4.6 | 3.4 | 0 | 2 | setosa | 1.163037 | False | 0.153333 | 0.106667 | 0.333333 |
| 7 | 5.0 | 3.4 | 1 | 0 | setosa | 0.000000 | False | 0.093333 | 0.226667 | 0.333333 |
| 8 | 4.4 | 2.9 | 0 | 0 | setosa | 1.205915 | True | 0.153333 | 0.226667 | 0.333333 |
| 9 | 4.9 | 3.1 | 1 | 0 | setosa | 0.000000 | False | 0.093333 | 0.226667 | 0.333333 |

400

403

404
405
406
407

| sepal_length | sepal_width | petal_length | petal_width | target_name | prob_target_name | ext_score | next_label | False_score | True_score | predicte |
|---|---|---|---|---|---|---|---|---|---|---|
| 6 | 1 | 7 | 7 | virginica | 0.373913 | 0.373913 | False | 0.373913 | 0.000000 | False |
| 0 | 7 | 0 | 0 | setosa | 0.286957 | 0.286957 | True | 0.000000 | 0.286957 | True |
| 0 | 0 | 3 | 3 | versicolor | 0.339130 | 0.339130 | False | 0.339130 | 0.000000 | False |
| 6 | 5 | 8 | 6 | virginica | 0.373913 | 0.373913 | False | 0.373913 | 0.000000 | False |
| 0 | 3 | 0 | 2 | setosa | 0.286957 | 0.286957 | True | 0.000000 | 0.286957 | True |
| 5 | 5 | 1 | 0 | setosa | 0.286957 | 0.286957 | True | 0.000000 | 0.286957 | True |
| 3 | 1 | 3 | 3 | versicolor | 0.339130 | 0.339130 | False | 0.339130 | 0.000000 | False |
| 3 | 8 | 2 | 2 | setosa | 0.286957 | 0.286957 | True | 0.000000 | 0.286957 | True |
| 8 | 1 | 8 | 8 | virginica | 0.373913 | 0.373913 | False | 0.373913 | 0.000000 | False |
| 1 | 7 | 0 | 2 | setosa | 0.286957 | 0.286957 | True | 0.000000 | 0.286957 | True |

FIG. 7

ANOMALY DETECTION USING DEEP LEARNING MODELS

TECHNICAL FIELD

This patent document generally relates to systems, devices, and techniques for threat detection in cyber security.

BACKGROUND

With the increased proliferation of computer systems in all aspects of our lives, including health records, financial transactions and travel, cyber security is becoming an important issue. Threats to an establishment's computers and data privacy may come from many different sources and at any time.

SUMMARY

The present document provides techniques that can be used to build computer software and devices that monitor a computer network or analyze data to detect anomaly in the usage or occurrence of a potentially fraudulent event.

In one example aspect, a computer-implemented method is disclosed. The method includes acquiring a plurality of records, each record having a corresponding number of attributes, determining, based on local density measurements, a first set of outliers in numeric data of a training portion of the plurality of records, tagging the first set of outliers using binary values, determining, based on a normally distributed attribute value frequency measure, a second set of outliers in categorical values of the training portion of the plurality of records, tagging the second set of outliers using binary values, and detecting anomalies in the plurality of records by classifying the plurality of records using the first set of tags and the second set of tags with a probabilistic classifier.

In another example aspect, a computer-implemented method, implemented by at least one computing platforms operating in a cluster-based parallel computing environment; includes acquiring a plurality of records, each record having a corresponding number of attributes, identifying outliers in the plurality of records using labels generated from processing the plurality of records through an ensemble of different deep learning models, wherein an output of at least one model is used as an input to at least one other model; and detecting anomalies in the plurality of records using a probabilistic classifier based on plurality of records and labels.

In yet another example aspect, a computer platform for implementing the above-described methods is disclosed. The computer platform may include a processor, a memory and a user interface.

In yet another example aspect, a computer program product having code stored thereupon is disclosed. The code, when executed by a processor, causes the processor to implement the above-described methods.

These, and other, aspects are further described in the present document.

BRIEF DESCRIPTION OF THE DRAWINGS

FIG. 7 shows an example of Naïve Bayes calculation using NAVF score.

DETAILED DESCRIPTION

The disclosed technology provides implementations and examples of anomaly detection that may be used in implementations that detect and mitigate cyber threats.

While most organizations put their focus on defending against and detecting cyber-attacks, insider attack, a more insidious threat is on the rise. Information security (InfoSec) professionals think that insider attacks are far more difficult to detect and prevent than external attacks, and insider threats have become more frequent in the past few years. Any organization that has information of value is vulnerable to threats from within. An incident in which confidential or sensitive information is stolen or damaged may not always be publicized, but significant damage can be done to the organization nonetheless.

User & Entity behavior analytics (UEBA) is often advocated as the best means to detect nefarious activity by internal actors. UEBA involves keeping track of what users are doing—particularly those with elevated privileges such as system administrators, and workers with access to highly sensitive information like intellectual property (IP) or customer account data—and looking for behaviors that are outside the range of normal activities. Anomaly detection may be used to identify user behavior that rises to a level of suspicion.

Overview of Anomaly Detection

Anomaly detection may be classified in three different categories: Supervised, Semi-supervised and Unsupervised. The classification depends on the extent to which labels (or "tags") are available in the modeling data.

If the data is clearly "tagged" (or marked) as either normal or anomalous then a supervised technique is used. In this approach, a predictive model is built on the tagged data to train a classifier that will later correctly classify normal and anomalous behaviors in unseen data. This method, however, has its challenges, the biggest one being obtaining accurate tags that represent a wide variety of good and bad behaviors. Often humans mark events as normal or anomalous and this can be erroneous.

In a semi-supervised approach, the tags are available only for a small portion of the data such as for only normal behavior. A predictive model is trained on normal behavior and is used to identify anomalies in unseen or test data.

Often labels for normal and anomalous behavior are simply not available and under these circumstances, an unsupervised method (or clustering) may be used for anomaly detection. In situations where far more normal behavior is exhibited in the data than anomalous behavior, it may be easier to identify anomalous behavior as an outlier.

Several embodiments disclosed in this patent are particularly useful for semi-supervised methods for classification. Depending on the type of data used, the classifying algorithm differs. Some examples are discussed herein.

Figure 1:
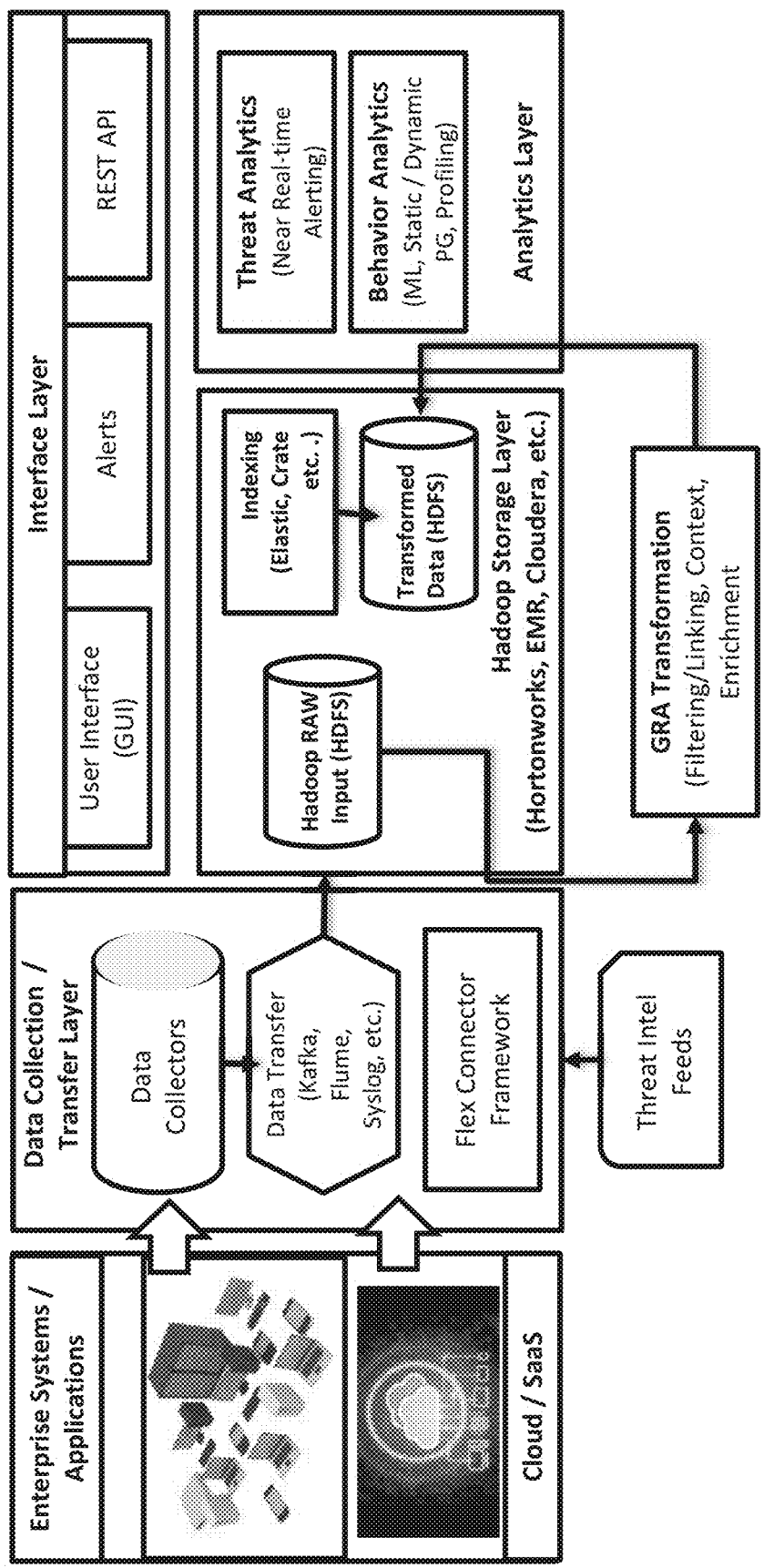
FIG. 1 shows an example of a computing system in which threat detection or fraud detection may be performed.

FIG. 1 depicts an example computing system that provides an environment for implementing the threat detection or fraud detection techniques described herein. As depicted in FIG. 1, enterprise systems and applications and an enterprises cloud or Software as a service (SaaS) presence may generate data during use, that is communicated to a data collection/transfer layer (DCTL). The DCTL may include individual functions such as a data collection function, a data transfer mechanism, and a flex connector framework. The DCTL may also receive feeds that provide intelligence data on threats.

In some embodiments, the data collectors may include a combination of processors and memory such that the processors log data received with time stamps and other environmental variables (e.g., enterprise identity, user identity, security level, etc.) and save the log data in the memory.

In various embodiments, the data transfer mechanism may use open source solutions such as Kafka for data stream management, syslog or Apache Flume for data movement.

The data transfer mechanism may provide the intelligence and data logs to a threat analytics system by storing into a Hadoop storage layer (HSL) or a database. The collected data, which may include a plurality of records. The HSL may also index the data and transform the data. The data transformation may include filtering data, linking relevant data records for the same entity with each other, extracting context of the data and enrichment of the data. The GRA transformation module may store the transformed data into the Hadoop file system (HDFS) in the HSL.

The data stored in the HSL may be made available via an interface layer which may be used to view or change the data. A user interface (command line or graphical user interface) may be used for accessing/viewing the data. An alerts module in the interface layer may be used to alert users with system malfunctions or with the anomalies found as described herein. The Alerts module (sometimes called the case management system) may be set to trigger an alert at various levels of issues found in the data or system. The data may also be made available via web access. A representational state transfer application programmer interface (REST API) module may provide access to data for reading or writing purpose using a published API.

A Threat Analytics (TA) module with near Real Time Alerting may detect threats in the plurality of records stored in the HSL using, for example, the techniques described in the present document. Behavior analytics with techniques such as Machine Learning, entity profiling, dynamic or static Peer Grouping (PG) may also be used.

Figure 2:
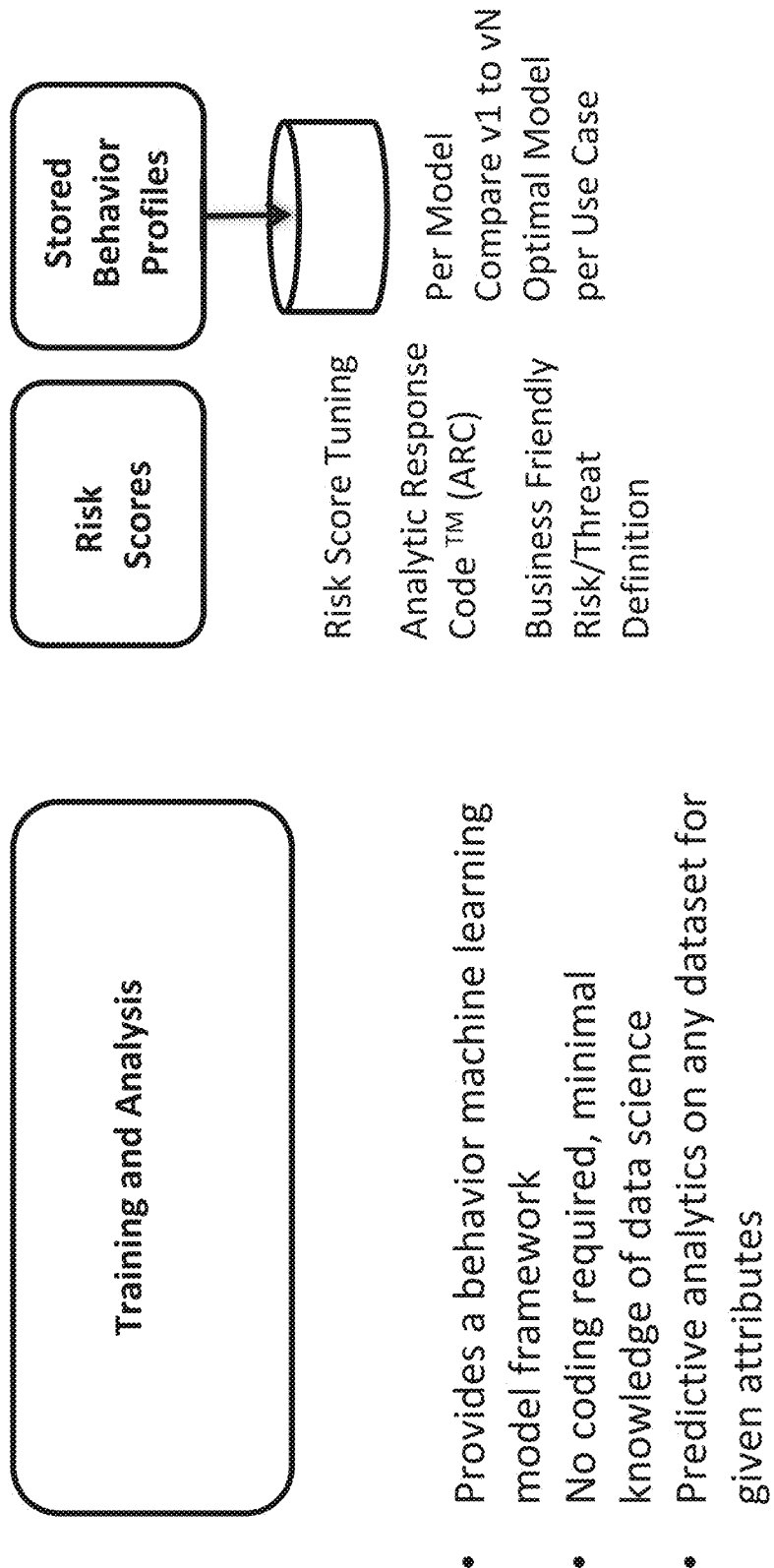
FIG. 2 is an architectural example of a cyber security system.
Figure 3:
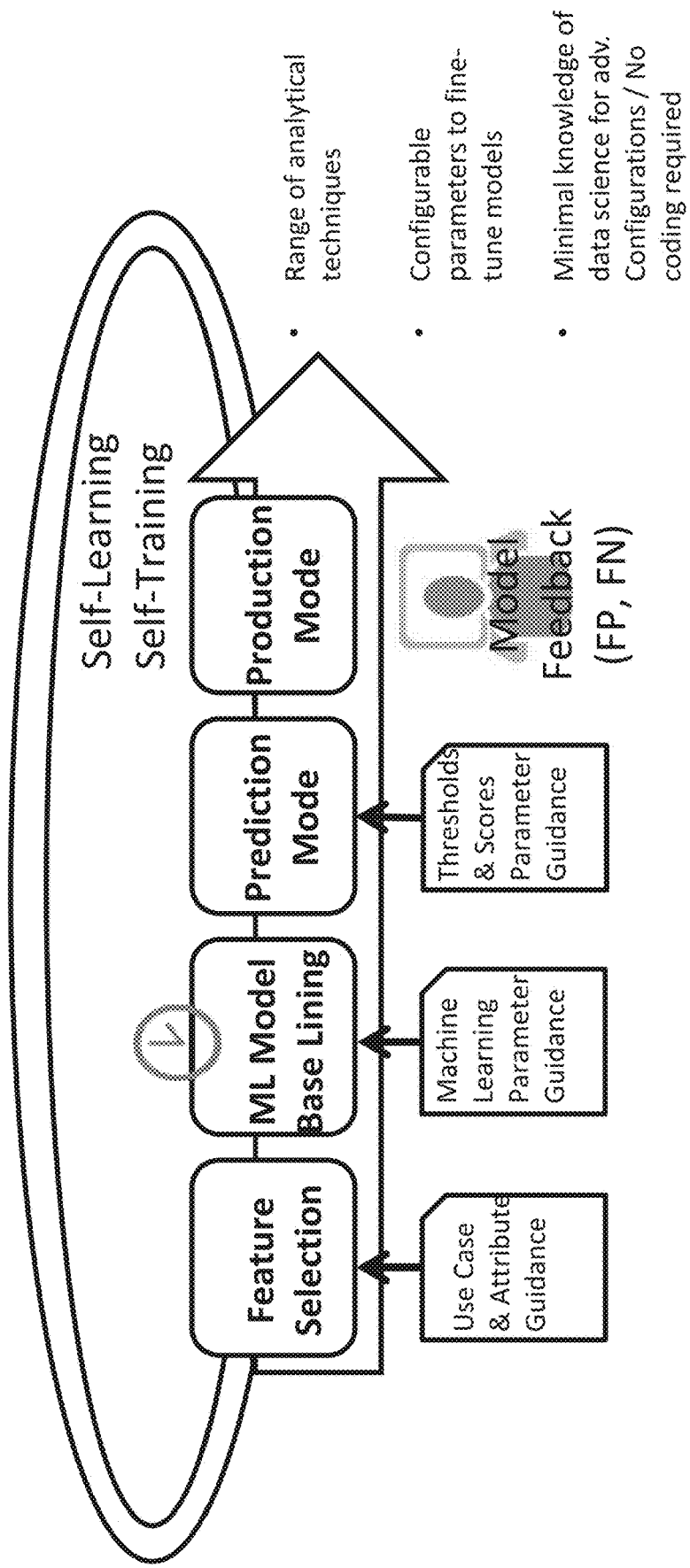
FIG. 3 is a block diagram of an example of machine learning based threat detection implementation.

FIG. 2 and FIG. 3 show an example of a framework for using machine learning in threat analytics. The arrangement of various functions performed in this workflow is shown for illustration only, and in actual implementations, these functions may be performed in parallel or sequentially, depending on their inter-dependencies.

As depicted in FIG. 2, training and analysis may be performed on a set of records (described in greater detail in FIG. 3) using machine learning. The records are scored by the ML model for riskiness. The risk scores may, for example, provide a number on a numerical scale between 0 and 100, higher the score, higher the risk of the entity. In addition to the risk score, individual event records are assigned a response code that is indicative of the type of threat. For facilitating user readability of the threats, a business-friendly risk/threat definition look up table may be used to not just provide the threat as a number, but also provide a plain English meaning of the type of threat.

One other feature of the machine learning model framework may be the use of stored behavior profile. After each run of training, it is possible to store the profile coefficients of a user/entity for future comparison with profiles generated by varying the model input parameters. This facilitates an educated choice of optimal parameter values to obtain the desired level of riskiness communicated by the overall score distribution.

FIG. 3 shows an example of a workflow that may be repeatedly iterated during an implementation. As depicted in the machine learning model framework, use cases for attribute guidance can be used in the Feature Selection step of anomaly detection process. In this step, attributes from the data are recommended for the ML modeling step. A ML model may be used to create the baseline behavior of a user with parameter guidance from Feature Selection. This is the Training phase in which features of the data records are extracted and stored as user profile coefficients. During Prediction phase, the unseen data is classified by the ML model based on user profile coefficients generated during training and threshold parameters set in prior to an anomaly detection run.

During production mode operation, the framework may use a self-learning mode to run anomaly detection on the records. The implementation allows for self-learning to occur, continuously as the model, receives feedback from a human operator marking true and false positives. This information is fed to the model and is learned by the ML during the (re)training session, and updated continually through the anomaly detection implementations. The feedback is from the case management system where in individual events flagged as anomalies can be dispositioned as False Positive/Negative. For example, a human operator feedback may be related to "real world" events. For example, when a person from an engineering department transfers to marketing department, his access of marketing department files may be flagged by machine learning as an anomalous event, but the machine may be trained by a human operator that this is not an anomaly due to a change in that person's job description. This information about false positives/negatives may be learned by the machine learning process and the learning may be used during future analysis of anomaly detection.

FIG. 4 to FIG. 7 show examples of data records taken from the iris dataset that may be used during the various workflows and calculations described in the present document, e.g., with respect to FIG. 2 and FIG. 3. The use of these records is further described in this patent document.

Figure 8:
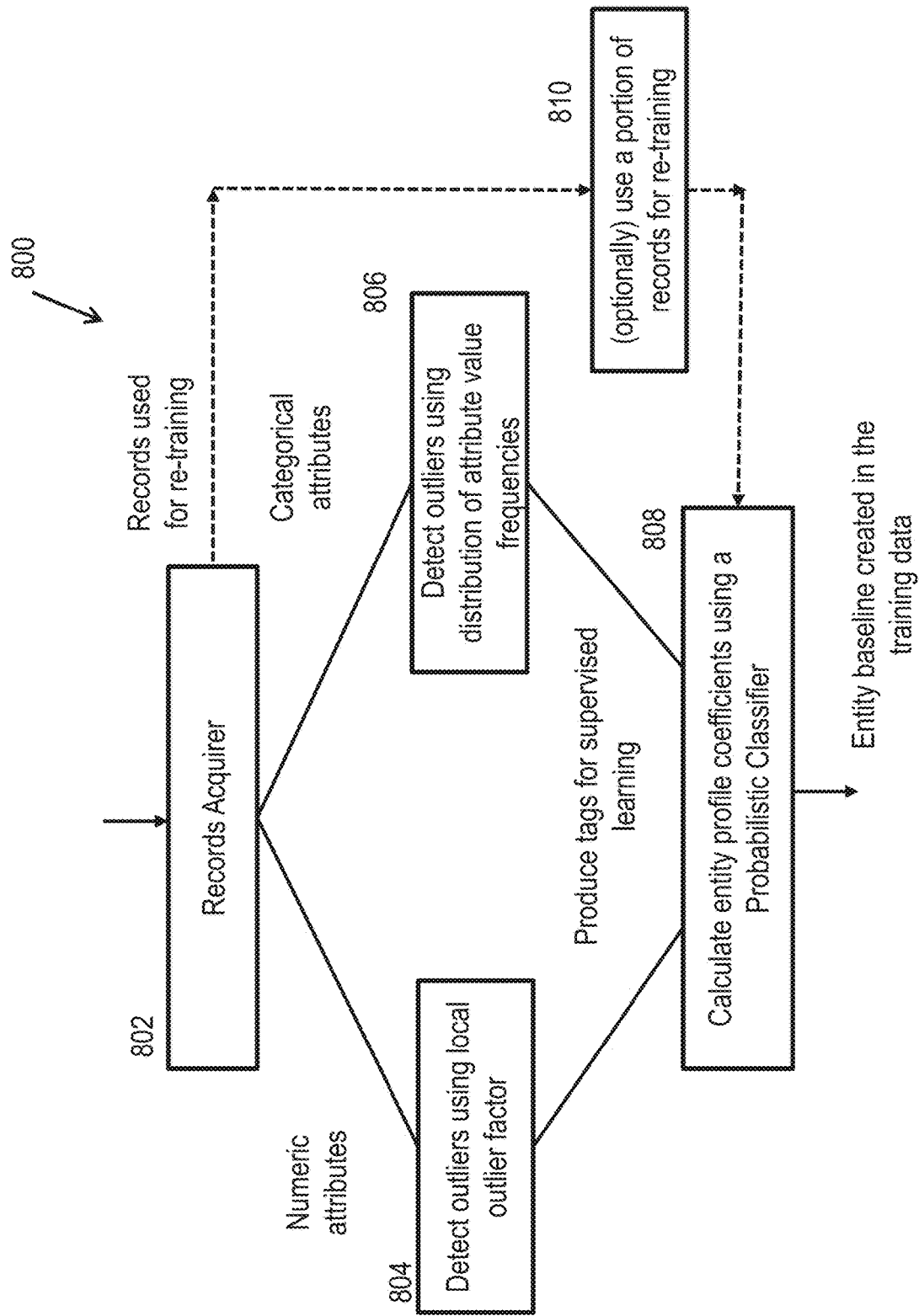
FIG. 8 is an example of a flowchart for processing a plurality of records for detecting anomalies.

FIG. 8 shows an example of a method 800 that may be implemented by a computer platform or by a cloud-based set of distributed computer resources. The method 800 includes, at 802, acquiring records. The records may be acquired automatically based on logs generated by information technology (IT) infrastructure of a business. In some implementations, the records may be acquired by an off-line process such as transfer of data via a storage medium such as tapes, hard drives, and so on. In some implementations, the records may be electronically provided to a threat and anomaly detection framework, e.g., as shown in FIG. 2 or FIG. 3.

In general, the records may have entries that have attributes that are numerical or categorical. For example, a user's login session duration is a numerical attribute for a user's record, indicating time in hours, minutes, and seconds, that a user has spent during each logging event in the IT infrastructure. Other examples of numerical records include a number of bytes downloaded, a number of bytes uploaded, time of entry in a building, time of exit from a building, and so on.

Non-limiting examples of categorical attributes may include the type of activity performed (such as login, logoff, file download, print etc.), network authentication status, names of machines accessed a listing of web sites visited by the user, IP addresses, site URLs, names of project folders or documents accessed, geo-location information, and so on. In general, categorical attributes may not be representable by a continuous distribution of numbers, but rather by a predetermined set of descriptive terms.

Records with numerical attributes may be processed at step 804 to detect outliers in the numeric attributes. Example implementations at step 804 include the use of local outlier detection using a variety of techniques such as the local outlier factor (LOF) technique described herein.

Records with categorical attributes may be processed at step 806 to identify outliers in the records. In some implementations, distribution of attribute volume frequencies may be used for step 806. Some embodiments may use the NAVF techniques described herein.

Each of the steps 804 and 806 may tag the records using binary tags. For example each record may be tagged with a "0" when the record appears to be normal, and with a "1" when the record is considered to be an outlier, either based on the LOF technique or based on the NAVF technique.

The resulting tagged records may be processed through a probabilistic classifier, such as a Naïve Bayes classifier, to calculate entity profile coefficients, at 808. For example, the entity may be a particular user or a particular machine. (e.g., Joe Smith, or Lobby login machine). The profile coefficients may refer to the various attributes of an entity and their "normal" values as learned by the ML. For example, profile coefficients may correspond to an average, a medians, a min, max, or any other statistical measure learned for a particular attribute of a particular entity. Advantageously, because the tags are binary values, a traditional Naïve Bayes classifier may be used without any changes.

In some implementations, an optional re-training process (810) may be used. The re-training process may be started, for example, in response to making a decision that the current entity profile coefficients are producing too many false positives, or after passage of a certain amount of time (e.g., once every six months). In some cases, the re-training may be associated with a real-world event such as a re-organization of a company's departments, deployment of a new software platform or a new remote working policy in business organization, and so on. A portion of the records acquired at step 802 may be used as training portion and results of the anomalies detected by the training portion may be used to train the probabilistic classifier. For example, a human operator may check the anomaly detection performed on the training portion and may alter training parameters or the thresholds used for anomaly detection.

Section headers are used in the description below only for the sake of improving readability and do not limit the use of disclosed technology to each section.

1A. Examples of Local Outlier Factor Based Labels with Naïve Bayes

One method disclosed herein allows a system to process disparate sources of data and generate labels and score for each event so it can be used to train a machine learning algorithm to recognize and detect outliers in the data stream without having access to prior tagged data. The Local Outlier Factor (LOF) based labeling may be applied on numeric attributes of input data. The LOF is used to build labels on previously unlabeled data which is then fed to a classifier state. In some implementations, a Naïve Bayes classifier may be used for training. Some example embodiments are described as follows.

Part 1—Generate a Set of Outlier Records with Labels and Scores

In this process, the input may be as follows: Dataset–S={N×M}

N=Number of Records/Transactions

M=Numeric Fields/Columns in the Dataset, where each record or transaction may be populated with the M columns of value.

A=Selected Numeric Attributes/Model Inputs

Figure 4:
FIG. 4 is a table that shows an example of determining a local outlier factor (LOF) from a dataset.

FIG. 4 depicts an example table 400 that shows calculation of an LOF from a dataset. The table 400 is shown to have N=10 number of records/transactions, one in each row. For each record, the various columns include example values for the corresponding sepal length, sepal width, petal length, petal width, target name, LOF score, LOF label, probable petal length, probable petal width, and probable target name.

In some embodiments, the local outlier factor is based on a concept of a local density, where a locality is given by k nearest neighbors, whose distance is used to estimate the density.

In some embodiments, the system compares the local density of a data point to the local densities of its neighbors, thereby identifying regions of similar density, and points that have a significant lower density than their neighbors. These points are then considered to be outliers.

The typical distance at which a point can be "reached" from its neighbors estimates the local density. The definition of "reachability distance" used in LOF is an additional measure to produce more stable results within clusters.

Output: K detected outliers.

In some implementations, output may be calculated by performing the following operations:

Read input data from dataset S for selected attributes A.

Normalize all attributes such that the values to be contained in 0-1 interval.

403: Calculate the Local Outlier Factor for the Normalized attributes as follows.

(a) For each data point $x_i$ the outlier score is defined as the ratio of average local reachability density of the neighbors divided by the scored data point own local reachability density (LRD)

$$LOF_k(x_i) = \frac{\sum_k LRD(x_k)/N_k(x_i)}{LRD(x_i)} \quad (1)$$

(b) The local reachability density of data entry $x_i$ is defined by $$LRD_k(x_i) = \frac{N_k(x_i)}{\sum_k r\_distance(x_i, x_k)} \quad (2)$$

(c) The reachability distance r_distance defined as:

$$r\_distance(x_i, x_j) = \max\{k\_distance(x_j), d(x_{ij})\} \quad (3)$$

(d) The k_distance($x_j$) defined as the maximum distance between point $x_j$ and farthest point in k neighborhood. The k neighborhood of $x_j$ is the collection of k-nearest points.

(e) For each data point pairs i, l, compute the Euclidean distance $$d(x_{il}) = \sqrt{\frac{1}{n}\sum_{j=1}^{m}(x_{ij} - x_{lj})^2} \quad (4)$$

where j runs over n numeric attributes

404: Return the set of K detected outliers with the normalized LOF Score.

405: Threshold value t is subject to the data being analyzed.

406: Label Outliers as True when greater than threshold, False otherwise.

407: The normalized score (404, 405) represent the final score on which outlier labels are generated.

An example of database records, and the corresponding results obtained during each of the above steps, are tagged in FIG. 4 with corresponding reference numerals.

Part II—Train a Probabilistic Classifier Using the Outlier Records and Predict on Test Data.

Input:

Dataset–O={N×A}, scored and labeled outlier records.

Discretization:

In order to feed the continuous features into the classifier, the normalized inputs may undergo the process of binning. Thus for each selected continuous feature in the normalized range [0 . . . 1] there may be 10 equal width bins that cover the value range. (a different number of bins may be used).

Training:

1. Calculate class prior probabilities for baseline and outlier classes $$p_0 = \frac{n_0}{n_0+n_1}; \quad p_1 = \frac{n_1}{n_0+n_1} \quad (5)$$

where $n_0$ and $n_1$ are the number of baseline and outlier records respectively occurring in the training sample.

2. For both classes calculate conditional probability for each attribute value $$p_1(x_{ij}) = \frac{n_1(x_{ij})}{n_1}; \quad p_0(x_{ij}) = \frac{n_0(x_{ij})}{n_0} \quad (6)$$

where $n_{1,0}(x_{ij})$ is the number of entries where attribute $A_j$ equal to value $x_{ij}$ for outliers and baseline labeled data respectively.

Part III: Prediction:

Each incoming data record will be assigned a score to reflect the probability of an instance to be an outlier.

Calculate class odds as the ratio of probability of outlier class to the probability of baseline class.

$$O_c = \frac{p_1}{p_0} \quad (7)$$

Calculate attribute odds:

$$O(x_{ij}) = \frac{p_1(x_{ij})}{p_0(x_{ij})} \quad (8)$$

503. Calculate total odds for data record:

$$O(x_i) = O_c \Pi_{j=1}^{j=m} O(x_{ij}) \quad (9)$$

504. Define probability of an outlier as:

$$p(x_i) = \frac{O(x_i)}{1+O(x_i)} \quad (10)$$

505. Calculate a score for the record and assign a prediction label.

Figure 5:
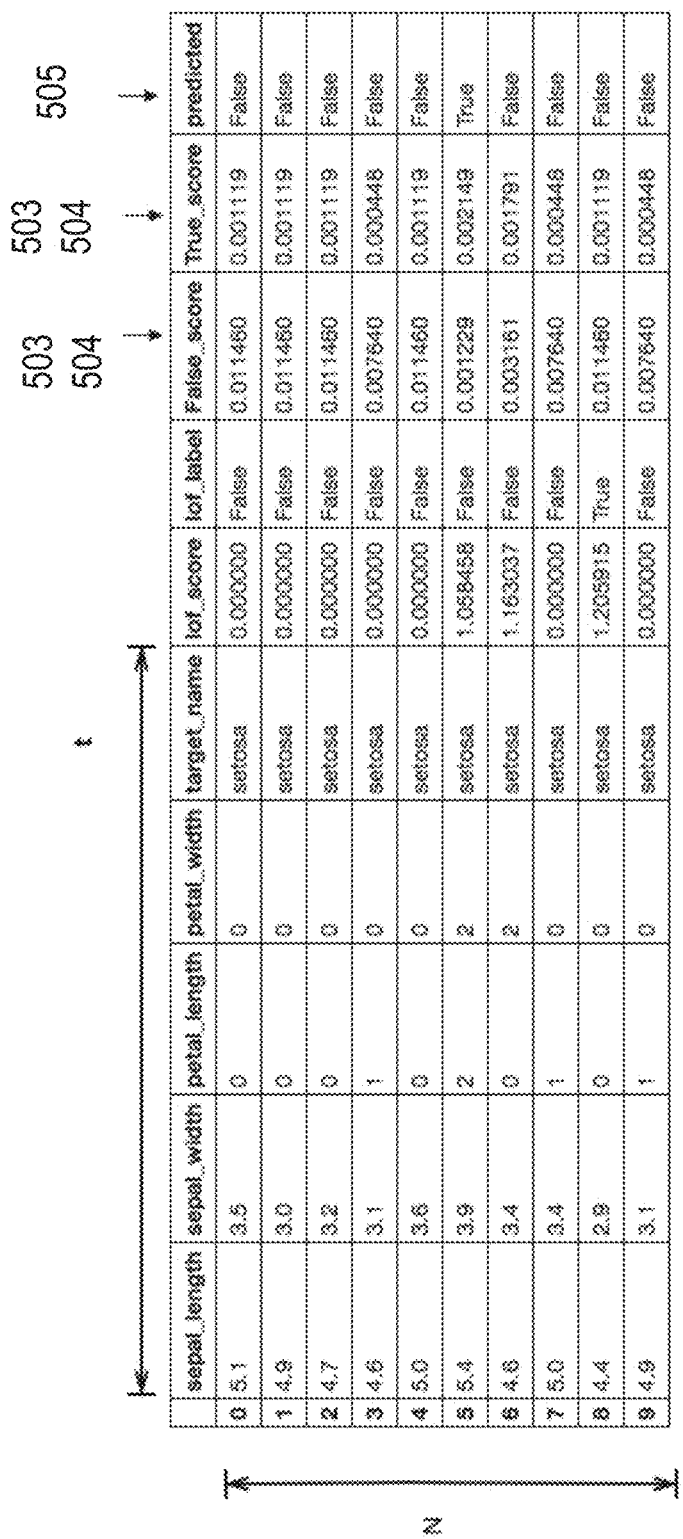
FIG. 5 is a tabular representation of an example of Naïve Bayes calculation using LOF data.
Figure 6:
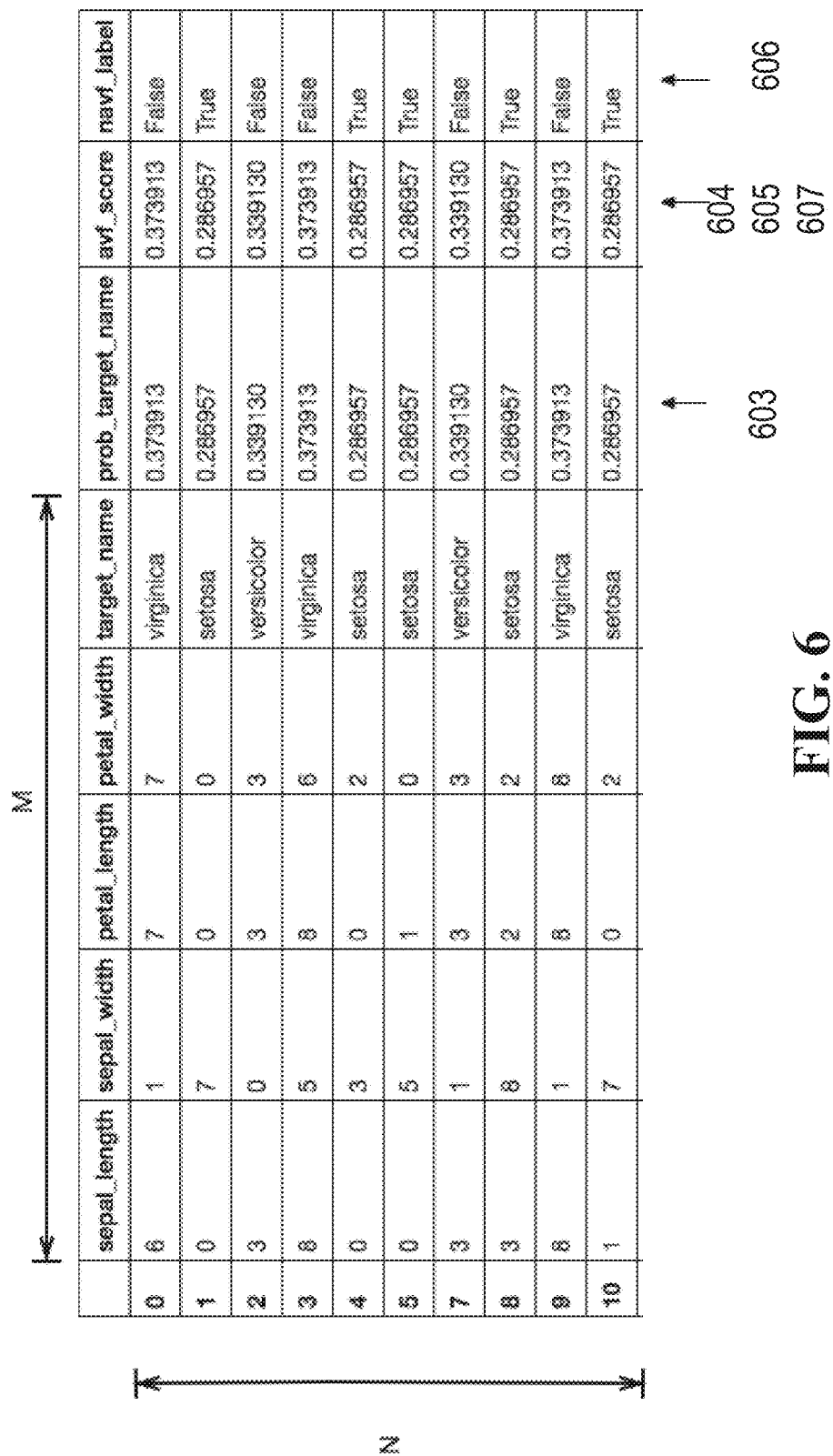
FIG. 6 is a tabular representation of an example of normally distributed attribute value frequency (NAVF) in a dataset.

An example of database records, and the corresponding results obtained during each of the above steps, are tagged in FIG. 5 with corresponding reference numerals.

1B. NAVF Based Labels with Naïve Bayes:

The Normally distributed Attribute Value Frequency (NAVF) based labeling is applied on categorical attributes of input data. The NAVF is used to build labels on previously unlabeled data which is then fed to a Naïve Bayes classifier for training.

Part I—

Generate a set of outlier records with labels and scores

Input:

Dataset–S={N×M}

N=Number of Records/Transactions

M=Fields/Columns in the Dataset.

A=Selected Attributes/Model Inputs

This may be represented as discussed with respect to the table of FIG. 4.

Output:

K detected outliers.

Read input data from dataset S for selected attributes A.

Initially label all data points for all attributes A as non-outliers.

603: For each attribute $A_j$ calculate the normalized frequencies of every attribute value across all entries, designate attribute $A_j$ value frequency at point $x_i$ as $f(x_{ij})$ 604: Calculate the Frequency Score of each input record $x_i$ as an average across selected attributes $$AVF(x_i) = \frac{1}{m}\sum_{j=1}^{m} f(x_{ij}) \quad (11)$$

605: Estimate mean μ and standard deviation σ for AVF distribution.

606: Label a record as an outlier if $$\frac{\mu - AVF(x_i)}{\sigma} > t \quad (12)$$

where t is the threshold describing the significance of outlier deviation from the distribution baseline.

607: Return the set of K detected outliers with the normalized AVF Score.

Threshold value t is subject to the data being analyzed.

Label Outliers as True if greater than threshold, False otherwise

The normalized score (4,5) represent the final score on which outlier labels are generated.

An example of database records, and the corresponding results obtained during each of the above steps, are tagged in FIG. 5 with corresponding reference numerals.

Part II—Train a Probabilistic Classifier Using the Outlier Records and Predict on Test Data.

Input:

Dataset-O={N×A}, scored and labeled outlier records. See FIG. 5.

Training:

1: Calculate class prior probabilities for baseline and outlier classes $$p_0 = \frac{n_0}{n_0 + n_1}; \; p_1 = \frac{n_1}{n_0 + n_1} \qquad (13)$$

where $n_0$ and $n_1$ are the number of baseline and outlier records respectively occurring in the training sample.

2: For both classes calculate conditional probability for each attribute value $$p_1(x_{ij}) = \frac{n_1(x_{ij})}{n_1}; \; p_0(x_{ij}) = \frac{n_0(x_{ij})}{n_0} \qquad (14)$$

where $n_{1,0}(x_{ij})$ is the number of entries where attribute $A_j$ equal to value $x_{ij}$ for outliers and baseline labeled data respectively.

Part III—Prediction:

Each incoming data record will be assigned a score to reflect the probability of an instance to be an outlier.

Calculate class odds as the ratio of probability of outlier class to the probability of baseline class $$O_c = \frac{p_1}{p_0} \qquad (15)$$

Calculate attribute odds $$O(x_{i,j}) = \frac{p_1(x_{ij})}{p_0(x_{ij})} \qquad (16)$$

703: Calculate total odds for data record $$O(x_i) = O_c \Pi_{j=1}^{j=m} O(x_{ij}) \qquad (17)$$

704: Define probability of an outlier as $$p(x_i) = \frac{O(x_i)}{1 + O(x_i)} \qquad (18)$$

705: Calculate a normalized score for the record and assign a prediction label $$S(x_i) = (\max - \min) \cdot p(x_i) + \min \qquad (19)$$

where max and min is the maximum and minimum score values respectively.

An example of database records, and the corresponding results obtained during each of the above steps, are tagged in FIG. 7 with corresponding reference numerals.

Deep Learning Techniques in Anomaly Detection

Algorithm chaining or ensemble modeling approach implemented in a cluster based parallel computing environment.

An analytics pipeline can be built using the following Deep Learning (DL) algorithms to perform a targeted workflow requirement that aims at solving a specific use-case. The pipeline is designed to be functional as an individual model to extract features and subsequently consume, which allows for customized exploration and investigation by the more advanced user. These models are 1. TF-IDF (Time Frequency Inverse Document Frequency)
2. LDA (Latent Dirichlet Allocation)
3. KMeans
4. KMeansAnomalyDetector
5. RandomForestAnomalyDetector Solutions for most use-case driven modeling usually involve multiple models working in tandem. Examples of such pipeline models—KMeans Anomaly Detector and RandomForest Anomaly Detector are illustrated as follows (see FIG. 9)

Deep learning models are designed to emulate unsupervised machine learning models where no data munging or pre-processing is required for input data. Input data will be taken as is unfiltered, where 1. TF-IDF transforms alphanumeric data into numeric token features,
2. LDA transforms token features into vector features that represent LDA topic distribution,
3. KMeans transform LDA topic features into clustering features where cluster centers and cluster prediction are done.

(TF-IDF+LDA+KMeans) of the pipeline performs data processing and establishes a similarity/distance based statistical summary setting the stage for anomaly detection. This mainly represents the process of model training.

Part I—DL Modeling—Training

With the training pipeline, we obtain:

The vector features that facilitates the cosine similarity computation from the LDA topic features against KMeans cluster centers.

The statistical summary of cosine similarity that provides information of min, max, mean and standard deviation.

The mechanism of anomaly detection that depends on the concept of model training process to establish a norm represented by the KMeans clustering centers and a mathematical threshold based on the statistical summary derived from the training dataset.

Part-II DL Modeling-Prediction

Anomalies that are based on distance/similarity deviation from the norm can then be identified by the prediction process that is described as follows. The prediction section of the pipeline is carried out by the implementation of KMeans Anomaly Detector or Random Forest Anomaly Detector. The difference between these two detectors is how the weights are assigned to the distance/similarity average that represents a raw anomaly score:

1. KMeans Anomaly Detector: the distance/similarity average is a weighted average that takes into account the sizes of clusters from the cluster prediction of the KMeans model.

2. Random Forest Anomaly Detector: the distance/similarity average is a weighted average that uses the probability prediction of the KMeans clusters by the Random Forest classifier model.

During the training phase, the goal is to find an optimal threshold that is used as a scalar to establish the threshold for anomaly detection based on the formula as follows:

Anomaly thresholding score=min+threshold*$std$

The distance/similarity averages of unseen data are then compared against the threshold established in the training process. A linear transformation is applied to the anomalous distance/similarity averages that map the raw scores to a numerical range of [50, 100].

Part III DL Anomaly Detection

A lower threshold may give a better recall with the risk of more false positives. A higher threshold leads to a better precision but at the risk of losing more true positives instead.

The similarity based anomaly detector identifies the anomalous events based on the average similarity scores in a K dimensional space (number of clusters) where the previously unseen data is NOT a driving force in the determination of anomaly. The criteria for anomalies is how far apart they are from the norm established by the KMeans cluster centers. Similarity driven anomaly detectors are highly dependent and sensitive to the training and hold-out dataset during the training phase. Models may require frequent retrain in order to maintain their optimal level of performance.

Figure 9:
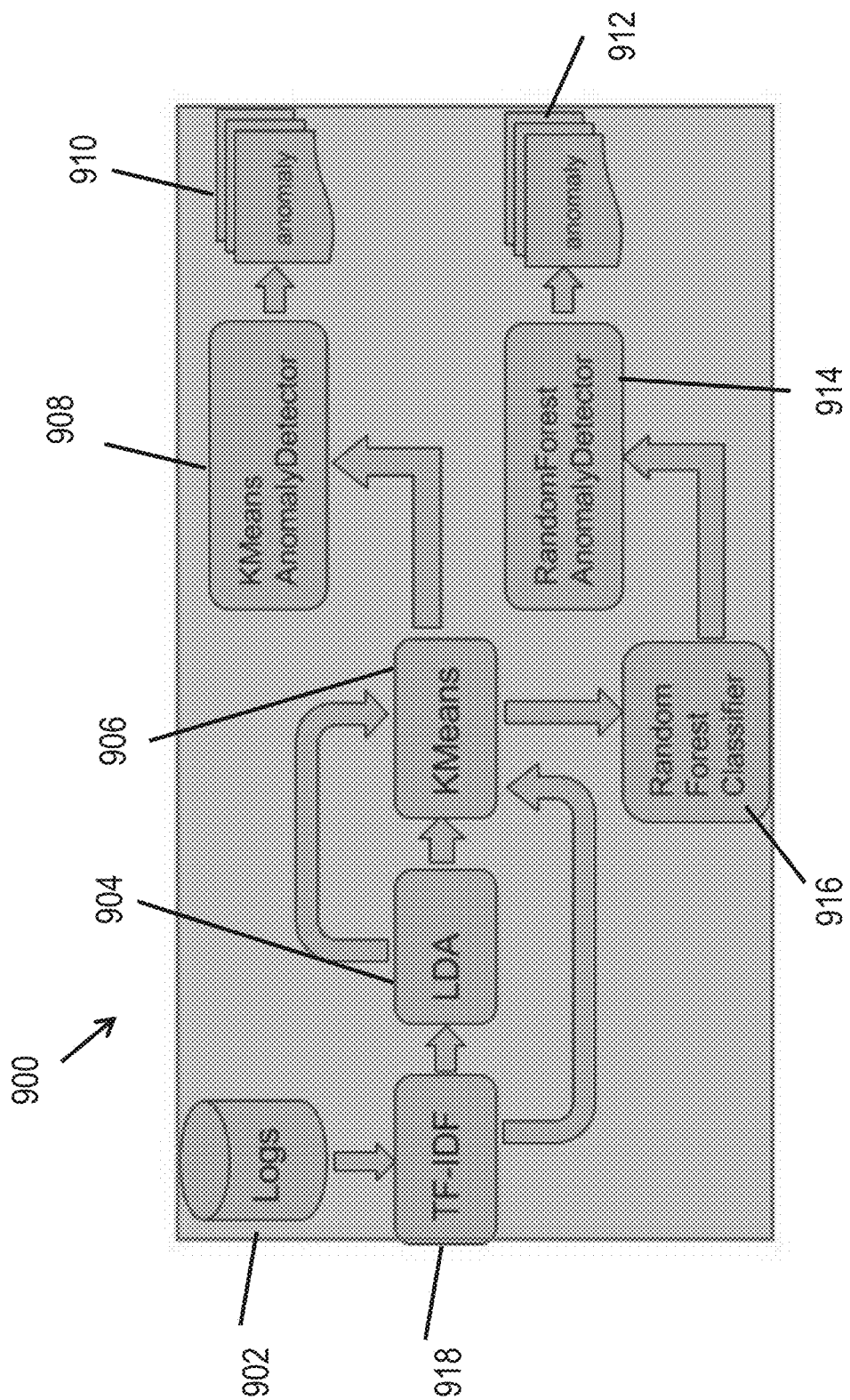
FIG. 9 illustrates an example of model chaining and pipeline using DL techniques.

FIG. 9 is a block diagram representation of a workflow 900 used for implementing a deep learning technique. Logs of records (902) may be analyzed using a TF-IDF step 918. The results of the TF-IDF (e.g., tagged records of outliers) may be input to an LDA module 904 and a KMeans module 906. The Kmeans module 906 may produce results that are used as input to KMeans Anomaly detector 908 and a classifier such as a Random Forest classifier 916 (followed by a Random Forest Anomaly Detector 914). The resulting anomalies may be reported and logged in logs 910 and 912, respectively. In some embodiments, the anomaly detection results from the logs 910 and 912 may be merged together to produce threat detection and anomalies. In some embodiments, the results may be treated separately. In general, business rules and past experience with accuracy may be used in decided which anomaly detection results are used for subsequent corrective action such as investigating events surrounding the occurrence of the anomaly or providing a feedback to the ML algorithm to train the ML algorithm.

Figure 10:
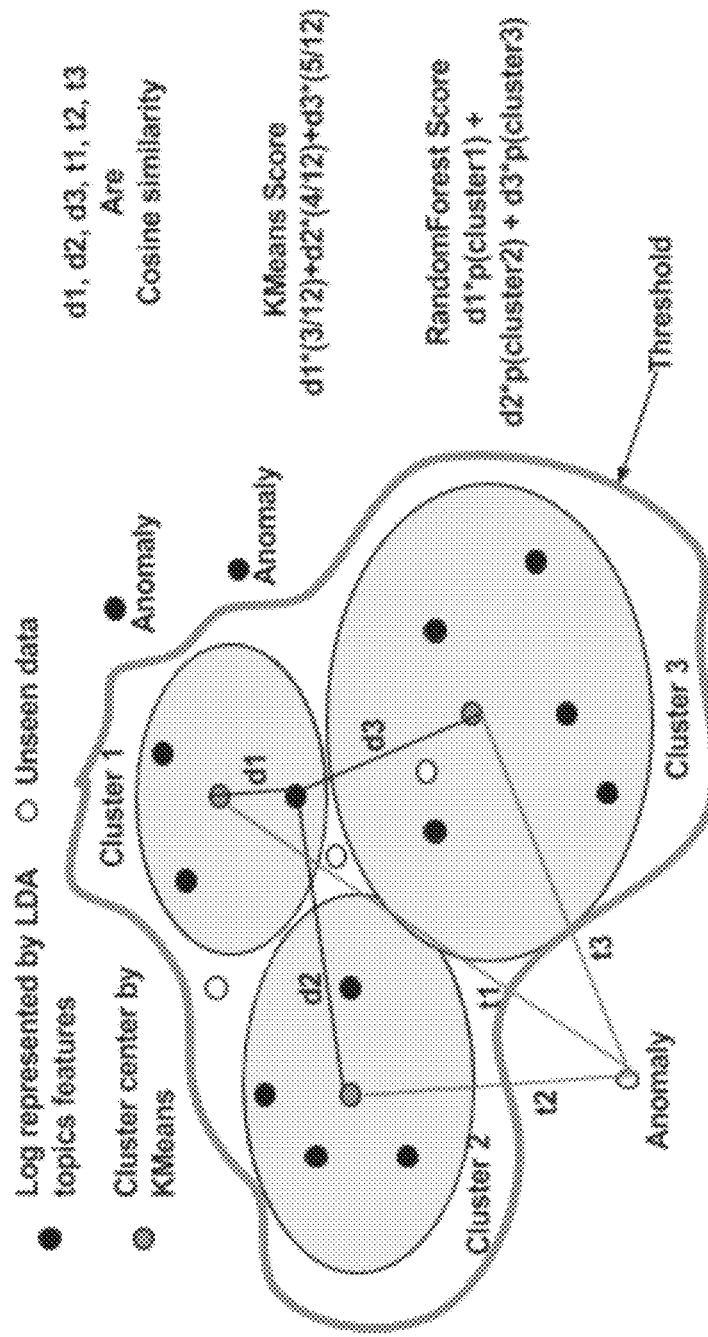
FIG. 10 is a pictorial depiction of an example of a deep learning cluster implementation.

FIG. 10 pictorially depicts an example implementation of the decision process using deep learning techniques described in the present document. The small circles represent various data points, or records with attribute values along a logical two-dimensional plane. During analysis, clusters of the data points may be formed, as indicated by the elliptical circles. An algorithm such as the KMeans algorithm may determine clusters and cluster centers. A threshold may be determined either by learning or by a combination of human user input and machine learning decision. The threshold may define a region in the two-dimensional plane such that data points or records with attribute values outside the threshold region may be identified as anomalies. Unseen data (data that is not from the training portion of the plurality of records) that falls within the threshold may not be flagged as anomaly even when it falls outside data clusters formed during the deep learning analysis.

Figure 11:
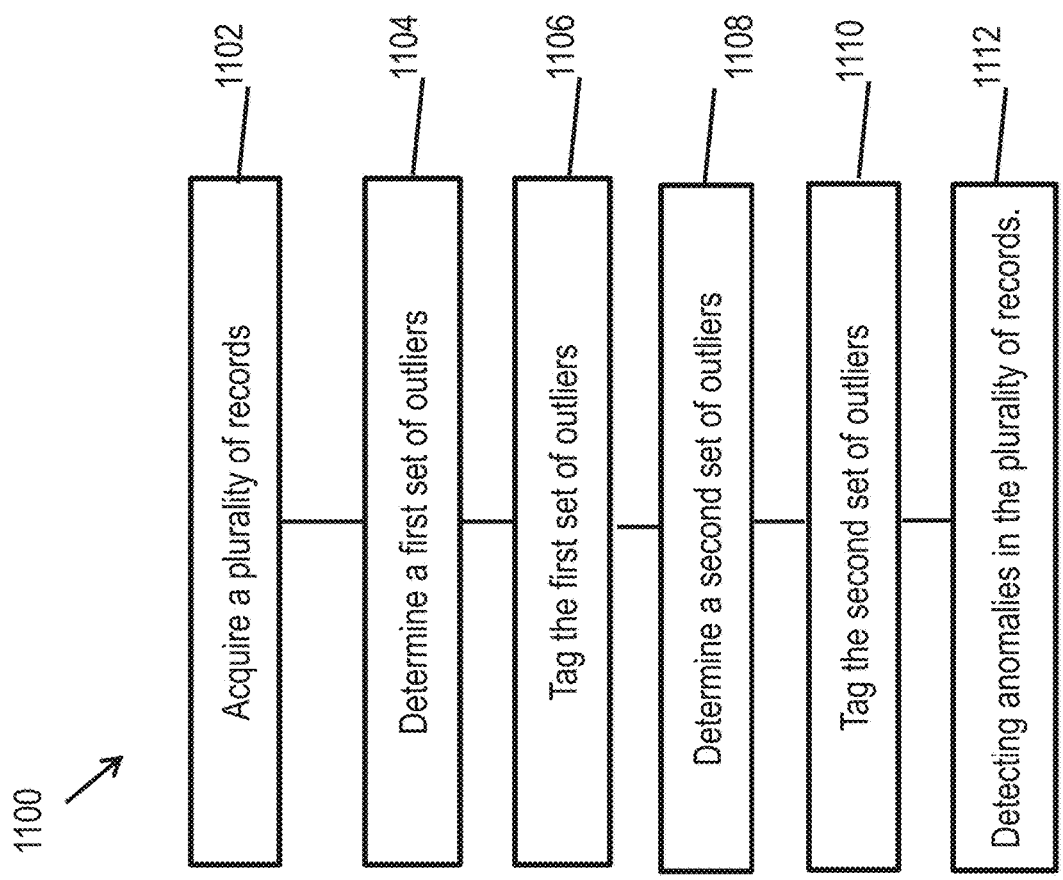
FIG. 11 is a flowchart of an example method for detecting outliers in a plurality of data records.

FIG. 11 is a flowchart of an example method 1100 implemented by a computer platform. The method 1100 includes acquiring (1102) a plurality of records, each record having a corresponding number of attributes. As described with reference to FIG. 2 and FIG. 3, the records may be acquired using a variety of techniques including electronic file transfer, or by reading from a computer-readable medium such as a storage drive or an optical disk.

The method 1100 includes determining (1104), based on local density measurements, a first set of outliers in numeric data of a training portion of the plurality of records. In some embodiments, e.g., described with reference to FIG. 4 and FIG. 5, the local density measurements may include determining local density of data points based on a measure of reachability of the data points from neighbors thereof. The method may include implementation of algorithmic steps as described in Equations 1 to 4. For example, in some embodiments, measure of reachability may be represented as r_distance($x\_i, x\_j$)=max[*i*] {k_distance($x\_j$), [ d(x] _ij)}, where r_distance is a reachability distance between data points $x\_i, x\_j$ where i and j are integers, and k_distance is a function representing a maximum distance between point $x\_j$ and farthest point in k neighborhood, wherein k neighborhood of $x\_j$ is the collection of k-nearest points.

The method 1100 includes tagging (1106) the first set of outliers using a first set of tags having binary values.

The method 1100 includes determining (1108), based on a normally distributed attribute value frequency measure, a second set of outliers in categorical values of the training portion of the plurality of records. The second set of outliers may be determined based on the steps described with reference to FIG. 6 and FIG. 7. For example, the second set of outliers may be determined by: calculating, for each attribute $A\_j$, normalized frequencies of every attribute value across all entries in the categorical values of the training portion of the plurality of records, calculating a frequency score for each input record xi as an average across selected attributes, and tagging a record as an outlier when the frequency score is above a threshold describing a deviation from a baseline The method 1100 includes tagging (1110) the second set of outliers using a second set of tags having binary values. As described in the present document, the binary values may be represented with Boolean true/false, e.g., using numbers zero and one. The second set of outliers may be determined by calculating a normalized frequency of occurrence of attributes in a selected set of attribute across record entries corresponding to the categorical values, averaging, for each record entry corresponding to the categorical values, normalized frequency values across all attribute values for the record entry to generate an attribute value frequency (AVF) for the record entry, comparing the AVF for the record entry with a mean and a standard deviation of a distribution of AVF values across the record entries corresponding to the categorical values, and tagging the record based on the comparing operation. The comparing operation may include, for example, comparing value of a ratio of difference between the mean and the AVF for the record entry, and the standard deviation with a threshold value.

The method 1100 includes detecting (1112) anomalies in the plurality of records by classifying the plurality of records using the first set of tags and the second set of tags with a probabilistic classifier.

In some embodiments, a human input anomaly confirmation in a case management system may provide a feedback signal for training the probabilistic classifier. In some embodiments, the probabilistic classifier may be a naïve Bayes classifier.

Various features of the above-described method may be described using the following clause based description:

1. A computer-implemented method; comprising: acquiring a plurality of records, each record having a corresponding number of attributes; determining, based on local density measurements, a first set of outliers in numeric data of a training portion of the plurality of records; tagging the first set of outliers using a first set of tags having binary values; determining, based on a normally distributed attribute value frequency measure, a second set of outliers in categorical values of the training portion of the plurality of records; tagging the second set of outliers using a second set of tags having binary values; and detecting anomalies in the plurality of records by classifying the plurality of records using the first set of tags and the second set of tags with a probabilistic classifier.

2. The method of clause 1, wherein the determining, based on local density measurements, the first set of outliers includes:

determining local density of data points based on a measure of reachability of the data points from neighbors thereof.

3. The method of clause 2, wherein the measure of reachability is calculated as:

$$r\_distance(x_i, x_j) = \max\{k\_distance(x_j), d(x_{ij})\}$$

where r_distance is a reachability distance between data points $x_i$, and $x_j$ where i and j are integers, and k_distance is a function representing a maximum distance between point $x_j$ and farthest point in k neighborhood, wherein a k neighborhood of $x_j$ is the collection of k-nearest points.

4. The method of clause 1, wherein the determining the second set of outliers includes: calculating, for each attribute A_j, normalized frequencies of every attribute value across all entries in the categorical values of the training portion of the plurality of records; calculating a frequency score for each input record $x_i$ as an average across selected attributes; and tagging a record as an outlier when the frequency score is above a threshold describing a deviation from a baseline.

5. The method of clause 1, further including, using a human input anomaly confirmation in case management system to provide a feedback signal for training the probabilistic classifier.

6. The method of clause 1 wherein the probabilistic classifier is a Naïve Bayes classifier.

7. The method of clause 1, wherein the determining the second set of outliers includes: calculating a normalized frequency of occurrence of attributes in a selected set of attributes across record entries corresponding to the categorical values; averaging, for each record entry corresponding to the categorical values, normalized frequency values across all attribute values for the record entry to generate an attribute value frequency (AVF) for the record entry; comparing the AVF for the record entry with a mean and a standard deviation of a distribution of AVF values across the record entries corresponding to the categorical values; and tagging the record based on the comparing.

8. The method of clause 7, wherein the comparing includes comparing value of a ratio of difference between the mean and the AVF for the record entry, and the standard deviation with a threshold value.

9. A computing device comprising a processor configured to perform operations of: acquiring a plurality of records, each record having a corresponding number of attributes; determining, based on a local density measurements, a first set of outliers in numeric data a first portion of the plurality of records; labeling the first portion of the plurality of records using a binary labeling scheme, thereby generating a labeled first portion of the plurality of records with a first set of tags; determining, based on a normally distributed attribute value frequency measure, a second set of outliers in a second portion of the plurality of records having categorical values; labeling the second portion of the plurality of records using the binary labeling scheme, thereby generating a labeled second portion of the plurality of records with a second set of tags; and detecting anomalies in the plurality of records by classifying the plurality of records using the first set of tags and the second set of tags with a probabilistic classifier.

10. The computing device of clause 9, wherein the determining the first set of outliers based on the local density measurements includes determining local density of data points based on a measure of reachability of the data points from neighbors thereof.

11. The computing device of clause 10, wherein the measure of reachability is calculated as:

$$r\_distance(x_i, x_j) = \max\{k\_distance(x_j), d(x_{ij})\}$$

where r_distance is a reachability distance between data points $x_i$, and $x_j$ where i and j are integers, and k_distance is a function representing a maximum distance between point $x_j$ and farthest point in k neighborhood, wherein a k neighborhood of $x_j$ is the collection of k-nearest points.

12. The computing device of clause 9, wherein the determining the second set of outliers based on the normally distributed attribute value frequency measure includes: calculating, for each attribute A_j, normalized frequencies of every attribute value across all entries in the second portion of the plurality of records; calculating a frequency score for each input record $x_i$ as an average across selected attributes; and labeling a record as an outlier by comparing the frequency score with a threshold.

13. The computing device of clause 9, further including, using a subset of the plurality of records to provide a feedback signal for training the probabilistic classifier.

14. The computing device of clause 9 wherein the probabilistic classifier is a Naïve Bayes classifier.

15. The computing device of clause 9, wherein the determining the second set of outliers includes: calculating a normalized frequency of occurrence of attributes in a selected set of attributes across the second portion of the plurality of records; averaging, for each record entry, normalized frequency values across all attribute values for the record entry to generate an attribute value frequency (AVF) for the record entry; comparing the AVF for the record entry with a mean and a standard deviation of a distribution of AVF values across the second portion of the plurality of records; and labeling the record entry as an outlier based on the comparing.

16. The computing device of clause 15, wherein the comparing includes comparing value of a ratio of difference between the mean and the AVF for the record entry, and the standard deviation with a threshold value.

17. A computer readable medium having processor-executable code for implanting an above-described method stored thereon.

Figure 12:
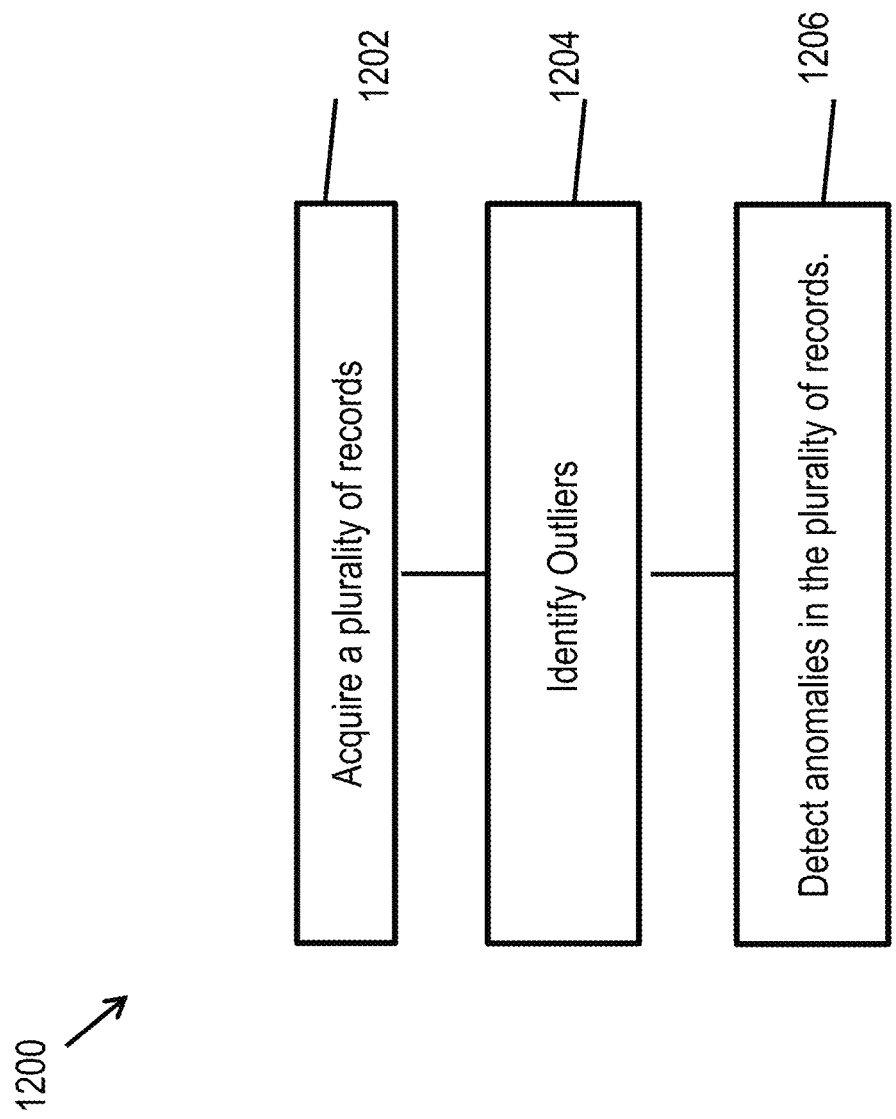
FIG. 12 is a flowchart of another example method for detecting outliers in a plurality of data records.

FIG. 12 is a flowchart for an example method 1200 in which deep learning may be performed for fault detection. The method 1200 includes, acquiring (1202) a plurality of records, each record having a corresponding number of attributes. The acquiring operation may be similar to 1102.

The method 1200 includes identifying (1204) outliers in the plurality of records using labels generated from processing the plurality of records through an ensemble of different deep learning models, wherein an output of at least one model is used as an input to at least one other model. In 1204, tags may be produced using the ensamble of different deep learning models.

The method 1200 includes detecting (1206) anomalies in the plurality of records using a probabilistic classifier based on plurality of records and labels.

In some embodiments, the pipeline of deep learning models includes at least two of: a model that uses a frequency of occurrence of a term in a document, a model that derives topic features, a clustering based model, an iterative clustering based model, or a model that uses tree-structures for attribute classification. Some possible implementations are described with reference to FIG. 8, FIG. 9 and FIG. 10.

As previously described, the model that uses frequency of occurrence comprises a term frequency inverse document frequency (TF-IDF) algorithm, the model that that derives topic features comprises a Latent Dirichlet Algorithm (LDA) model, the clustering based model comprises a KMeans algorithm, the iterative clustering based model comprises a KMeans Anomaly Detector System, and the model that uses tree-structures for attribute classification comprises a Random Forest anomaly detector model.

In some embodiments, the model that uses frequency of occurrence comprises a term frequency inverse document frequency (TF-IDF) algorithm, the model that derives topic features comprises a Latent Dirichlet Algorithm, a clustering based model that uses KMeans algorithm and a classifier model that uses a multitude of decision trees, including two distinct pipelines differentiated by KMeans clustering, and the Random Forest Anomaly Detector.

In some embodiments, the plurality of records is trained with the TF-IDF model, followed by the LDA model, followed by the KMeans model of the pipeline to establish a similarity/distance based statistical baseline for anomaly detection; and wherein the Kmeans Anomaly Detector model is used for anomaly detection at an output of the KMeans model, and wherein a Random Forest classifier in a Random Forest Anomaly Detector model are used to detect anomalies during prediction.

In some embodiments, the method 1200 may further include using outputs of both the TF-IDF model and the LDA model as inputs to the KMeans model.

Figure 13:
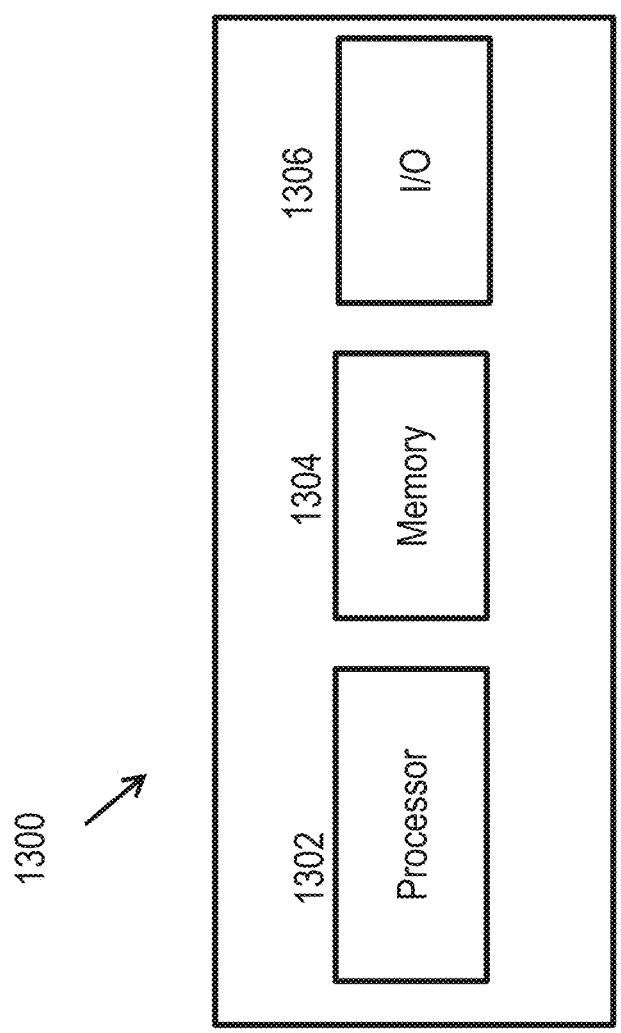
FIG. 13 shows an example of a computer apparatus for implementing techniques described in the present document.

FIG. 13 shows a block diagram of an example of a computer apparatus 1300 that may be used to implement various techniques disclosed in the present document, including for example, methods 800, 1100 or 1200. The apparatus 1300 may include one or more processors 1302, a memory 1304 and input-output (I/O) mechanism 1306. The processor 1302 may be configured to implement various techniques described herein. The memory 1304 may store data records, results of analysis of the data instructions for the processor to execute. The I/O mechanism 1306 may include human interface devices such as keyboard and display monitors. The I/O mechanism 1306 may also include network interfaces such as Ethernet, wireless interfaces, or other IP networking interface for communicating data to or from other computers.

In some embodiments, various methods described in the present documents may be embodied in the form a computer readable medium that stores processor-executable code for performing these methods.

It will be appreciated by one of skill in the art that techniques for anomaly detection in the domain of Cyber Security is achieved through unsupervised and semi-supervised methods of monitoring user and entity behavior over a period of time. In this patent document we discuss multiple methods designed to capture contextual and collective anomalous behaviors that do not conform to a pre-defined notion of normal in categorical and numeric data in network, database, DLP, badge and other logs. This is a method to handle previously unseen as well as evolving normal behavior. Deep learning techniques offer the flexibility of algorithm or model chaining to achieve maximum accuracy and low false positive rates.

From the foregoing, it will be appreciated that specific embodiments of the invention have been described herein for purposes of illustration, but that various modifications may be made without deviating from the scope of the invention. Accordingly, the invention is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method, implemented by at least one computing platform operating in a cluster-based parallel computing environment, comprising:
   acquiring a plurality of records, each record having a corresponding number of attributes;
   identifying outliers in the plurality of records using labels generated from processing the plurality of records through a pipeline of deep learning models, wherein each deep learning model includes a set of unique instructions configured to output a unique numeric output, wherein a first set of numeric outputs of a first set of models are used as numeric inputs to a second set of models, wherein the labels are a binary value based on pre-set threshold values, the binary value being one of true or false, and wherein the second set of models includes:
   a first path comprising a first group of models, and
   a second path different from the first path and comprising a second group of models, wherein the second group includes at least one more model than the first group; and
   detecting anomalies in the first path and the second path using a probabilistic classifier based on the plurality of records and the labels,
   wherein the detecting anomalies in the first path and the second path includes identifying a data point that has an attribute value outside a threshold region, the threshold region surrounding a plurality of clusters determined by a clustering model of the pipeline of deep learning models.

2. The method of claim 1, wherein the pipeline of deep learning models consists of at least two of: a model that uses a frequency of occurrence of a term in a document, a model that derives topic features, a clustering based model, an iterative clustering based model, and/or a model that uses tree-structures for attribute classification.

3. The method of claim 2, wherein the model that uses frequency of occurrence comprises a term frequency inverse document frequency (TF-IDF) algorithm, the model that derives topic features comprises a Latent Dirichlet Algorithm (LDA) model, the clustering based model comprises a KMeans algorithm, the iterative clustering based model comprises a KMeans Anomaly Detector System, and the model that uses tree-structures for attribute classification comprises a Random Forest anomaly detector model.

4. The method of claim 2, wherein the model that uses frequency of occurrence comprises a term frequency inverse document frequency (TF-IDF) algorithm, the model that derives topic features comprises a Latent Dirichlet Algorithm, a clustering based model that uses a KMeans algorithm and a classifier model that uses a multitude of decision trees, including two distinct pipelines of deep learning models differentiated by KMeans clustering, and a Random Forest Anomaly Detector.

5. The method of claim 3 wherein the plurality of records is trained with the TF-IDF algorithm, followed by the LDA model, followed by the KMeans algorithm of the pipeline to establish a similarity/distance based statistical baseline for anomaly detection; and wherein the Kmeans Anomaly Detector system is used for anomaly detection at an output of the KMeans algorithm, and wherein a Random Forest classifier in the Random Forest Anomaly Detector model are used to detect anomalies during prediction.

6. The method of claim 4, further including,
   using outputs of both the TF-IDF algorithm and the LDA algorithm as inputs to the KMeans algorithm.

7. A computer system comprising multiple processors in a parallel computing environment, the processors configured to perform operations of:
   acquiring a plurality of records, each record having a corresponding number of attributes;
   identifying outliers in the plurality of records using labels generated from processing the plurality of records through a pipeline of different deep learning models, wherein each deep learning model includes a set of unique instructions configured to output a unique numeric output, wherein a first set of numeric outputs of a first set of models are used as numeric inputs to a second set of models, wherein the labels are a binary value based on pre-set threshold values, the binary value being one of true or false, and wherein the second set of models includes:
a first path comprising a first group of models, and
a second path different from the first path and comprising a second group of models, wherein the second group includes at least one more model than the first group; and
detecting anomalies in the first path and the second path based on the plurality of records and the labels,
wherein the detecting anomalies in the first path and the second path includes identifying a data point that has an attribute value outside a threshold region, the threshold region surrounding a plurality of clusters determined by a clustering model of the pipeline of deep learning models.

8. The system of claim 7, wherein the pipeline of deep learning models consists of at least two of: a model that uses a frequency of occurrence of a term in a document, a model that derives topic features, a clustering based model, an iterative clustering based model, and/or a model that uses tree-structures for attribute classification.

9. The system of claim 8, wherein the model that uses frequency of occurrence comprises a term frequency inverse document frequency (TF-IDF) algorithm, the model that derives topic features comprises a Latent Dirichlet Algorithm (LDA) model, the clustering based model comprises a KMeans algorithm, the iterative clustering based model comprises a KMeans Anomaly Detector System, and the model that uses tree-structures for attribute classification comprises a Random Forest anomaly detector model.

10. The system of claim 8, wherein the model that uses frequency of occurrence comprises a term frequency inverse document frequency (TF-IDF) algorithm, the model that derives topic features comprises a Latent Dirichlet Algorithm, a clustering based model that uses KMeans algorithm and a classifier model that uses a multitude of decision trees, including two distinct pipelines of deep learning models differentiated by KMeans clustering, and a Random Forest Anomaly Detector.

11. The system of claim 9, wherein the plurality of records is trained with the TF-IDF algorithm, followed by the LDA model, followed by the KMeans algorithm of the pipeline to establish a similarity/distance based statistical baseline for anomaly detection; and wherein the Kmeans Anomaly Detector system is used for anomaly detection at an output of the KMeans algorithm, and wherein a Random Forest classifier in the Random Forest Anomaly Detector model are used to detect anomalies during prediction.

12. The system of claim 11, wherein the processor is further configured to perform:
using outputs of both the TF-IDF algorithm and the LDA algorithm as inputs to the KMeans algorithm.

13. A computer-readable medium having code stored thereon, the code, upon execution, causing a processor to implement a method comprising:
acquiring a plurality of records, each record having a corresponding number of attributes;
identifying outliers in the plurality of records using labels generated from processing the plurality of records through an ensemble of different deep learning models, wherein each deep learning model includes a set of unique instructions configured to output a unique numeric output, wherein a first set of numeric outputs of a first set of models are used as numeric inputs to a second set of models, wherein the labels are a binary value based on pre-set threshold values, the binary value being one of true or false, and wherein the second set of models includes:
a first path comprising a first group of models, and
a second path different from the first path and comprising a second group of models, wherein the second group includes at least one more model than the first group; and
detecting anomalies in the first path and the second path using a probabilistic classifier based on the plurality of records and the labels,
wherein the detecting anomalies in the first path and the second path includes identifying a data point that has an attribute value outside a threshold region, the threshold region surrounding a plurality of clusters determined by a clustering model of the ensemble of deep learning models.

14. The computer-readable medium of claim 13, wherein the pipeline of deep learning models consists of at least two of: a model that uses a frequency of occurrence of a term in a document, a model that derives topic features, a clustering based model, an iterative clustering based model, and/or a model that uses tree-structures for attribute classification.

15. The computer-readable medium of claim 14, wherein the model that uses frequency of occurrence comprises a term frequency inverse document frequency (TF-IDF) algorithm, the model that derives topic features comprises a Latent Dirichlet Algorithm (LDA) model, the clustering based model comprises a KMeans algorithm, the iterative clustering based model comprises a KMeans Anomaly Detector System, and the model that uses tree-structures for attribute classification comprises a Random Forest anomaly detector model.

16. The computer-readable medium of claim 14, wherein the model that uses frequency of occurrence comprises a term frequency inverse document frequency (TF-IDF) algorithm, the model that derives topic features comprises a Latent Dirichlet Algorithm, a clustering based model that uses KMeans algorithm and a classifier model that uses a multitude of decision trees, including two distinct pipelines of deep learning models differentiated by KMeans clustering, and a Random Forest Anomaly Detector.

17. The computer-readable medium of claim 15, wherein the plurality of records is trained with the TF-IDF algorithm, followed by the LDA model, followed by the KMeans algorithm to establish a similarity/distance based statistical baseline for anomaly detection; and wherein the Kmeans Anomaly Detector system is used for anomaly detection at an output of the KMeans algorithm, and wherein a Random Forest classifier in the Random Forest Anomaly Detector model is used to detect anomalies during prediction.

18. The computer-readable medium of claim 16, wherein the method further includes:
using outputs of both the TF-IDF algorithm and the LDA algorithm as inputs to the KMeans algorithm.

* * * * *